(12) United States Patent
Ryu et al.

(10) Patent No.: US 9,337,691 B2
(45) Date of Patent: *May 10, 2016

(54) WIRELESS CHARGING SET

(75) Inventors: Young Ho Ryu, Yongin-si (KR); Eun Seok Park, Suwon-si (KR); Sang Wook Kwon, Seongnam-si (KR); Young Tack Hong, Seongnam-si (KR); Nam Yun Kim, Seoul (KR); Yun Kwon Park, Dungducheon-si (KR); Dong Zo Kim, Yongin-si (KR); Jin Sung Choi, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1187 days.

This patent is subject to a terminal disclaimer.

(21) Appl. No.: 13/053,542

(22) Filed: Mar. 22, 2011

(65) Prior Publication Data

US 2011/0241612 A1   Oct. 6, 2011

(30) Foreign Application Priority Data

Mar. 31, 2010 (KR) .......................... 10-2010-0029546

(51) Int. Cl.
*H02J 7/00* (2006.01)
*H02J 17/00* (2006.01)
*H02J 5/00* (2016.01)
*H02J 7/02* (2016.01)

(52) U.S. Cl.
CPC ................. *H02J 17/00* (2013.01); *H02J 5/005* (2013.01); *H02J 7/0027* (2013.01); *H02J 7/025* (2013.01)

(58) Field of Classification Search
USPC ............. 320/107, 108; 348/53; 455/509, 45.1
See application file for complete search history.

(56) References Cited

U.S. PATENT DOCUMENTS

| | | | |
|---|---|---|---|
| 6,437,685 B2 | 8/2002 | Hanaki | |
| 2001/0043266 A1* | 11/2001 | Robinson et al. | ............... 348/53 |
| 2002/0177884 A1 | 11/2002 | Ahn et al. | |
| 2005/0194926 A1* | 9/2005 | Di Stefano | .................... 320/108 |
| 2009/0010028 A1* | 1/2009 | Baarman et al. | ................ 363/25 |
| 2009/0096413 A1* | 4/2009 | Partovi et al. | ................. 320/108 |
| 2009/0140690 A1 | 6/2009 | Jung | |
| 2009/0168305 A1* | 7/2009 | Fleig et al. | .................... 361/528 |
| 2009/0271047 A1* | 10/2009 | Wakamatsu | .................. 700/295 |
| 2009/0322861 A1* | 12/2009 | Jacobs et al. | .................... 348/53 |
| 2010/0219695 A1* | 9/2010 | Komiyama et al. | ........... 307/104 |

FOREIGN PATENT DOCUMENTS

| | | |
|---|---|---|
| CN | 101385218 A | 3/2009 |
| JP | 6-46460 A | 2/1994 |
| JP | 2005-110399 A | 4/2005 |
| JP | 2006-203997 A | 8/2006 |
| JP | 2009-136133 | 6/2009 |

(Continued)

OTHER PUBLICATIONS

International Search Report Issued for International Application No. PCT/KR2011/002050 on Mar. 25, 2011.

(Continued)

*Primary Examiner* — Yalkew Fantu
(74) *Attorney, Agent, or Firm* — NSIP Law

(57) ABSTRACT

Provided is a wireless recharging set. A source unit including a source resonator may transmit power wirelessly in all directions, and a device may receive the transmitted wireless power regardless of location.

19 Claims, 15 Drawing Sheets

(56) References Cited

FOREIGN PATENT DOCUMENTS

| | | |
|---|---|---|
| JP | 2009-195034 | 8/2009 |
| KR | 20-0187207 | 4/2000 |
| KR | 10-2006-0007662 | 1/2006 |
| KR | 10-2007-0017804 | 2/2007 |
| KR | 10-2008-0106186 | 12/2008 |
| KR | 10-2009-0006263 | 1/2009 |
| KR | 10-2009-0056546 | 6/2009 |
| KR | 10-2009-0131746 | 12/2009 |
| WO | WO 2007/084717 A2 | 7/2007 |
| WO | WO 2009/140220 A1 | 11/2009 |

OTHER PUBLICATIONS

Japanese Office Action issued Jan. 6, 2015 in counterpart Application No. JP. 2013-502454 (9 pages, in Japanese, with English translation).

European Search Report issued May 8, 2014 in counterpart European Patent Application No. 11762961.8 (6 pages).

Chinese Office Action issued Jun. 30, 2014 in counterpart Chinese Patent Application No. 201180022251.4 (7 pages, in Chinese).

Chinese Office Action issued on Sep. 8, 2015 in counterpart Chinese Application No. 201180022251.4 (10 pages in English, 8 pages in Chinese).

* cited by examiner

WIRELESS CHARGING SET

CROSS-REFERENCE TO RELATED APPLICATION(S)

This application claims the benefit under 35 U.S.C. §119(a) of Korean Patent Application No. 10-2010-0029546, filed on Mar. 31, 2010, in the Korean Intellectual Property Office, the entire disclosure of which is incorporated herein by reference for all purposes.

BACKGROUND

1. Field

The following description relates to a wireless charging set that is capable of wirelessly charging a device regardless of location.

2. Description of Related Art

Battery performance of portable electronic devices has become a critical issue. Besides portable electronic devices, home appliances may be provided with a function of wirelessly transmitting data. However, power is typically supplied to the home appliances and the portable electronic devices through a power line.

Among wireless power transmission technologies, a technology exists for wirelessly supplying power to a device or a battery of the device using a resonator. However, when the device is charged using a wireless power transmission technology, a charging efficiency may decrease due to a location or an angle of the resonator of the device. For example, when a source resonator that provides the wireless power is positioned perpendicular to a target resonator that receives the wireless power, the wireless power may neither be transmitted nor be received.

SUMMARY

In one general aspect, there is provided a wireless charging set comprising a source unit that is flexible and that comprises at least one source resonator configured to transmit power wirelessly, and a device that comprises at least one target resonator matched with the wireless power transmitted which is configured to receive the wireless power from the source unit, and to charge a power source using the wireless power received by the at least one target resonator.

The source unit may be disposed in a bar in a pillar shape, and the device may be located around the bar.

The source unit may be disposed in a charging platform of the device.

The source unit may be disposed in a bar in a pillar shape and a charging platform of the device.

When a plurality of devices are to be charged, the plurality of devices may be simultaneously charged by the source unit.

The device may comprise a plurality of target resonators, and the plurality of target resonators may be disposed perpendicular to each other.

The device may comprise a plurality of target resonators, and the plurality of target resonators may simultaneously receive the wireless power.

The at least one source resonator may be a thin film resonator.

The at least one target resonator may be wrapped with a film for waterproofing and shielding.

The device may be three dimensional (3D) eyewear, and the 3D eyewear may include a first target resonator disposed in a temple of the eyewear, and a second target resonator disposed in a bridge or a frame of the eyewear.

In another aspect, there is provided a source unit for wirelessly transmitting power to at least one device, the source unit comprising an exterior surface, one or more source resonators that are flexible, that are disposed on the exterior surface, and that are configured to transmit power wirelessly to the at least one device.

The exterior surface may comprise a cylindrical shape, and the one or more source resonators may be flexibly wrapped around the cylindrical shaped exterior surface.

The exterior surface may comprise a platform and a cylindrical shaped bar protruding from the platform, and each of the platform and the cylindrically shaped bar may comprise one or more source resonators for wirelessly transmitting power to the at least one device.

The one or more source resonators may comprise a plurality of source resonators that are disposed in parallel to each other on the exterior surface.

The one or more source resonators may be configured to transmit power wirelessly in an omni-directional fashion.

The one or more source resonators may be configured to simultaneously transmit power wirelessly to a plurality of devices.

In another aspect there is provided a device for receiving power wirelessly from a source unit that comprises one or more flexible source resonators attached to an exterior surface of the source unit, the device comprising a target resonator configured to receive power wirelessly from the one or more flexible source resonators of the source unit, and a target unit configured to transfer the received power to drive the operation of the device.

The device may further comprise a matching control configured to set an impedance matching frequency of the target resonator to perform impedance matching with the one or more flexible source resonators and the target resonator Other features and aspects will be apparent from the following detailed description, the drawings, and the claims.

Figure 1:
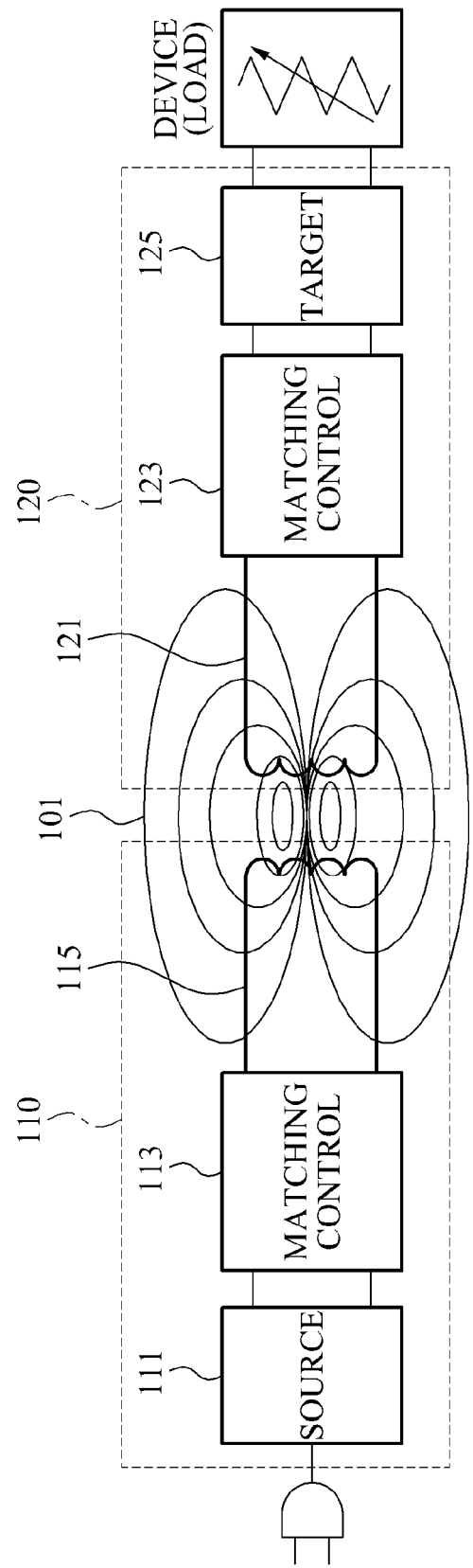
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

A wireless power transmission technology is a technology for wirelessly transmitting energy from a power source to a device. A transmission distance may include not only a short range of several millimeters, but also a mid-range of a plurality of meters.

The terms charge and recharge used herein refer to charging a device using power.

FIG. 1 illustrates an example of a wireless power transmission system.

In this example, power is transmitted wirelessly using the wireless power transmission system and may be referred to as resonance power.

Referring to FIG. 1, the wireless power transmission system may have a source-target structure that includes a source and a target. The wireless power transmission system may include a resonance power transmitter 110 corresponding to the source and a resonance power receiver 120 corresponding to the target.

The resonance power transmitter 110 may include a source unit 111 and a source resonator 115. The source unit 111 may receive energy from an external voltage supplier which may be used to generate resonance power. The resonance power transmitter 110 may further include a matching control 113 to perform resonance frequency or impedance matching.

For example, the source unit 111 may include an alternating current (AC)-to-AC (AC/AC) converter, an AC-to-direct current (DC) (AC/DC) converter, and a (DC/AC) inverter. The AC/AC converter may adjust a signal level of an AC signal input from an external device to a desired level. The AC/DC converter may output a DC voltage at a predetermined level by rectifying an AC signal output from the AC/AC converter. The DC/AC inverter may generate an AC signal, for example, a signal of a few megahertz (MHz) to tens of MHz band by quickly switching a DC voltage output from the AC/DC converter.

The matching control 113 may set at least one of a resonance bandwidth and an impedance matching frequency of the source resonator 115. Although not illustrated, the matching control 113 may include at least one of a source resonance bandwidth setting unit and a source matching frequency setting unit. The source resonance bandwidth setting unit may set the resonance bandwidth of the source resonator 115. The source matching frequency setting unit may set the impedance matching frequency of the source resonator 115. In this example, a Q-factor of the source resonator 115 may be determined based on the setting of the resonance bandwidth of the source resonator 115 or the setting of the impedance matching frequency of the source resonator 115.

The source resonator 115 may transfer electromagnetic energy to a target resonator 121, as shown in FIG. 1. For example, the source resonator 115 may transfer resonance power to the resonance power receiver 120 through magnetic coupling 101 with the target resonator 121. The source resonator 115 may resonate within the set resonance bandwidth.

In this example, the resonance power receiver 120 includes the target resonator 121, a matching control 123 to perform resonance frequency or impedance matching, and a target unit 125 to transfer the received resonance power to a load. For example, the load may be a device or the operation of the device that corresponds to the resonance power receiver 120. For example, the resonance power receiver 120 may correspond to a mobile phone, and the target unit 125 may transfer the received power to drive the operation of the mobile phone.

The target resonator 121 may receive electromagnetic energy from the source resonator 115. The target resonator 121 may resonate within the set resonance bandwidth.

The matching control 123 may set at least one of a resonance bandwidth and an impedance matching frequency of the target resonator 121. Although not illustrated, the matching control 123 may include at least one of a target resonance bandwidth setting unit and a target matching frequency setting unit. The target resonance bandwidth setting unit may set the resonance bandwidth of the target resonator 121. The target matching frequency setting unit may set the impedance matching frequency of the target resonator 121. In this example, a Q-factor of the target resonator 121 may be determined based on the setting of the resonance bandwidth of the target resonator 121 or the setting of the impedance matching frequency of the target resonator 121.

The target unit 125 may transfer the received resonance power to the load. For example, the target unit 125 may include an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

As an example, the source resonator 115 and the target resonator 121 may be configured in a helix coil structured resonator, a spiral coil structured resonator, a meta-structured resonator, and the like.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. For example, the resonance bandwidth of the source resonator 115 may be set wider or narrower than the resonance bandwidth of the target resonator 121. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In wireless power transmission employing a resonance scheme, the resonance bandwidth may be taken into consideration. When the Q-factor considering a change in a distance between the source resonator 115 and the target resonator 121, a change in the resonance impedance, impedance mismatching, a reflected signal, and the like, is Qt, Qt may have an inverse-proportional relationship with the resonance bandwidth, as given by Equation 1.

$$\frac{\Delta f}{f_0} = \frac{1}{Qt} \quad \text{[Equation 1]}$$
$$= \Gamma_{S,D} + \frac{1}{BW_S} + \frac{1}{BW_D}$$

In Equation 1, $f_0$ corresponds to a central frequency, $\Delta f$ corresponds to a change in a bandwidth, $\Gamma_{S,D}$ corresponds to a reflection loss between the source resonator 115 and the target resonator 121, BWS corresponds to the resonance bandwidth of the source resonator 115, and BWD corresponds to the resonance bandwidth of the target resonator 121. For example, the BW-factor may indicate either 1/BWS or 1/BWD.

For example, a change in the distance between the source resonator 115 and the target resonator 121, a change in a location of at least one of the source resonator 115 and the target resonator 121, and the like, may cause impedance mismatching between the source resonator 115 and the target resonator 121 to occur. The impedance mismatching may be a direct cause in decreasing an efficiency of power transfer. When a reflected wave corresponding to a transmission signal that is partially reflected and returned is detected, the matching control 113 may determine that the impedance mismatching has occurred, and may perform impedance matching. For example, the matching control 113 may change a resonance frequency by detecting a resonance point through a waveform analysis of the reflected wave. The matching control 113 may determine, as the resonance frequency, a frequency that has a minimum amplitude in the waveform of the reflected wave. For example, to improve wireless power transfer, the matching control 113 may change the resonance frequency such that the reflected wave that is reflected in response to the resonance frequency, has a minimum amplitude.

Figure 2:
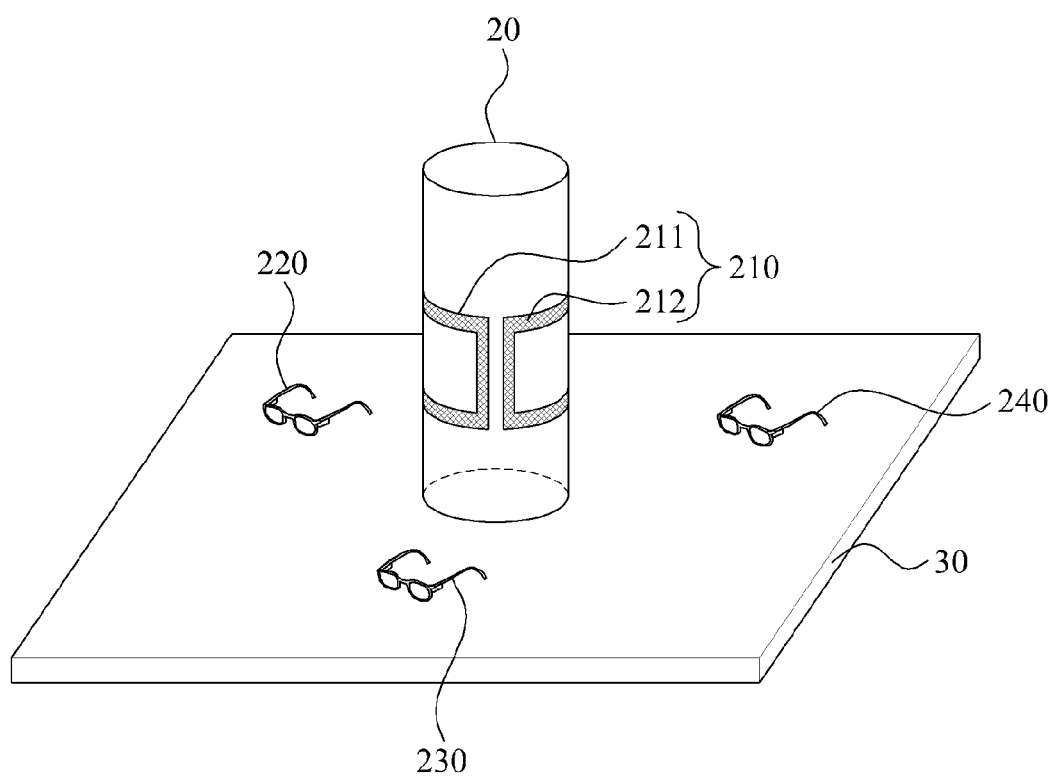
FIG. 2 is a diagram illustrating an example of a wireless charging set.

FIG. 2 illustrates an example of a wireless charging set.

Referring to FIG. 2, the wireless charging set includes a source unit 210 and a plurality of devices 220, 230, and 240.

The source unit 210 may include a plurality of source resonators 211 and 212 that transmit wireless power in all directions. In FIG. 2, although two source resonators are illustrated, the number of source resonators is not limited thereto, for example, the number of source resonators may be one, two, three, or more. The source unit 210 may be disposed in a bar 20 in a pillar shape. The plurality of source resonators 211 and 212 may be disposed at any location of the bar 20, for example, on the left and right, upwardly and downwardly, and/or randomly on the same surface or different surfaces of the bar 20.

The source unit 210 or the plurality of source resonators 211 and 212 may be made of a flexible material. For example, when the bar 20 has a cylinder shape, the source unit 210 or the plurality of source resonators 211 and 212 may be flexibly disposed along a side of the cylindrical bar 20, without degrading a function of wireless power transmission.

For example, at least one of the plurality of source resonators 211 and 212 may be a three dimensional (3D) resonator in which a plurality of thin film resonators are disposed in parallel. By disposing the plurality of thin film resonators in parallel, a transmission efficiency and transmission distance of the wireless power may be improved.

The plurality of devices 220, 230, and 240 may be disposed around the bar 20 to recharge a power source. For example, as illustrated in FIG. 2, after the plurality of devices 220, 230, and 240 are placed on a support 30 in which the bar 20 is disposed, and the plurality of devices 220, 230, and 240 may receive the wireless power from the source unit 210.

The bar 20 and the support 30 may be, for example, a platform of a computer, a TV monitor, and the like. The plurality of devices 220, 230, and 240 may include any device that may receive power wirelessly. In this example, the devices that receive power wirelessly are 3D eyewear for viewing a 3D image. Other non-exhaustive examples of devices that may receive power wirelessly include, for example, a Bluetooth headset used with a 3D television, a laptop, a portable terminal, and the like.

The source unit 210 may transmit power omni-directionality. For example, when the plurality of devices 220, 230, and 240 are at a location in which the wireless power may be received, the plurality of devices 220, 230, and 240 may receive the wireless power from the source unit 210. For example, the plurality of devices 220, 230, and 240 may be charged, regardless of an angle formed between a surface of a target resonator disposed on the plurality of devices 220, 230, and 240 and a surface of the bar 20 in which the source unit 210 is located. As another example, the plurality of devices 220, 230, and 240 may be charged regardless of a location of the plurality of devices 220, 230, and 240.

To achieve the omni-directionality, each of the plurality of devices 220, 230, and 240 may include at least one target resonator and a charging circuit. Hereinafter, the device 220 is described as an example.

The device 220 may receive wireless power by being matched with wireless power transmitted from the source unit 210, and may be charged by a charging circuit using the received wireless power. The device 220 may be charged using a power source using the wireless power received by the at least one target resonator from among a plurality of target resonators.

For example, when the plurality of target resonators are matched with the wireless power, the device 220 may simultaneously receive the wireless power using two target resonators. The plurality of target resonators may be disposed such that they are approximately perpendicular to each other. By disposing the plurality of target resonators to be perpendicular to each other, a match may not occur because each of the plurality of target resonators may not influence one another due to an orthogonality of a field that occurs at the plurality of target resonators. Using such characteristic features, power may be received through the field from the source resonator. As described above, in an example in which the plurality of target resonators simultaneously receive the wireless power, the received wireless power may be combined to be charged, and thus, wireless power may be transmitted, received, and charged and or recharged more efficiently.

The plurality of devices 220, 230, and 240 may share a time during which the wireless power is received from the source unit 210. For example, the plurality of devices 220, 230, and 240 may simultaneously recharge using the wireless power transmitted from the source unit 210. As another example, the plurality of devices may not simultaneously receive, but instead, may receive power one at a time.

Figure 3:
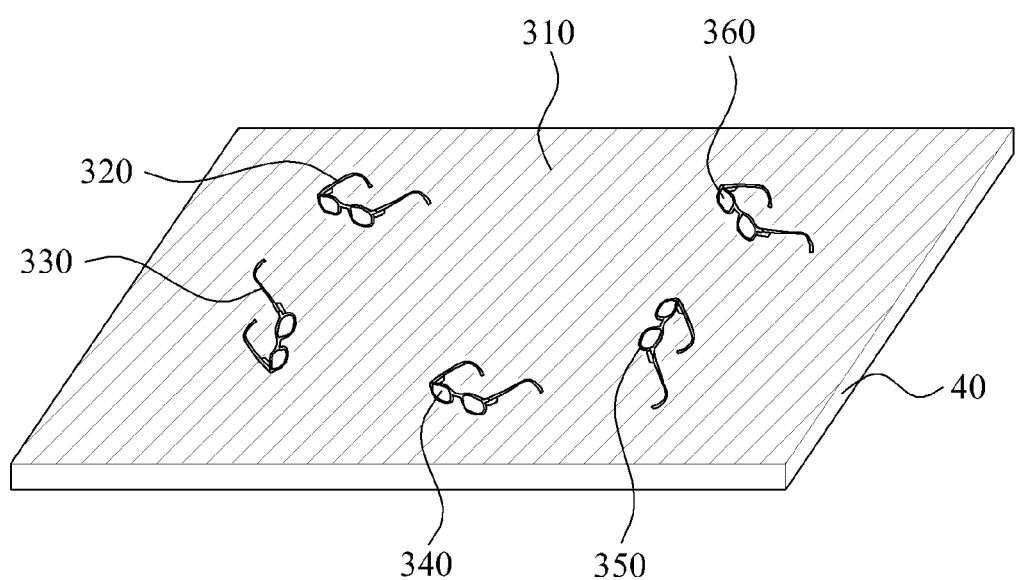
FIG. 3 is a diagram illustrating another example of a wireless charging set.

FIG. 3 illustrates another example of a wireless charging set.

Referring to FIG. 3, the wireless charging set includes a source unit 310 and a plurality of devices 320 to 360.

The source unit 310 and the plurality of devices 320 to 360 are similar to a source unit 210 and a plurality of devices 220 to 240 that are described with reference to FIG. 2, and a further description is omitted. The source unit 310 may transmit wireless power in all directions, and may include at least one flexible source resonator. The source unit 310 may be disposed on a surface of a charging platform 40, for example, on the top surface of the charging platform 40. For example, a plurality of source resonators may be randomly disposed on a surface of the charging platform 40 or in fixed positions on the charging platform 40.

The plurality of devices 320 to 360 may be charged on a surface of the recharging platform 40. Each of the plurality of devices 320 to 360 may include at least one target resonator. When the plurality of devices 320 to 360 are placed near or on the recharging platform 40, each target resonator may be matched with the wireless power transmitted in all directions from the source unit 310, and each of the devices 320 to 360 may be charged using the matched wireless power. For example, the plurality of devices 320 to 360 may be charged regardless of an angle formed between a surface of a target resonator disposed on the plurality of devices 320 to 360 and a surface of the source resonator disposed on the source unit 310. As another example, the plurality of devices 320 to 360 may be charged regardless of a location of the plurality of devices 320 to 360.

As described with reference to FIG. 2, the plurality of devices 320 to 360 may include any device that can be charged such as 3D eyewear, a Bluetooth headset used with a 3D television, a laptop, a portable terminal, and the like.

Figure 4:
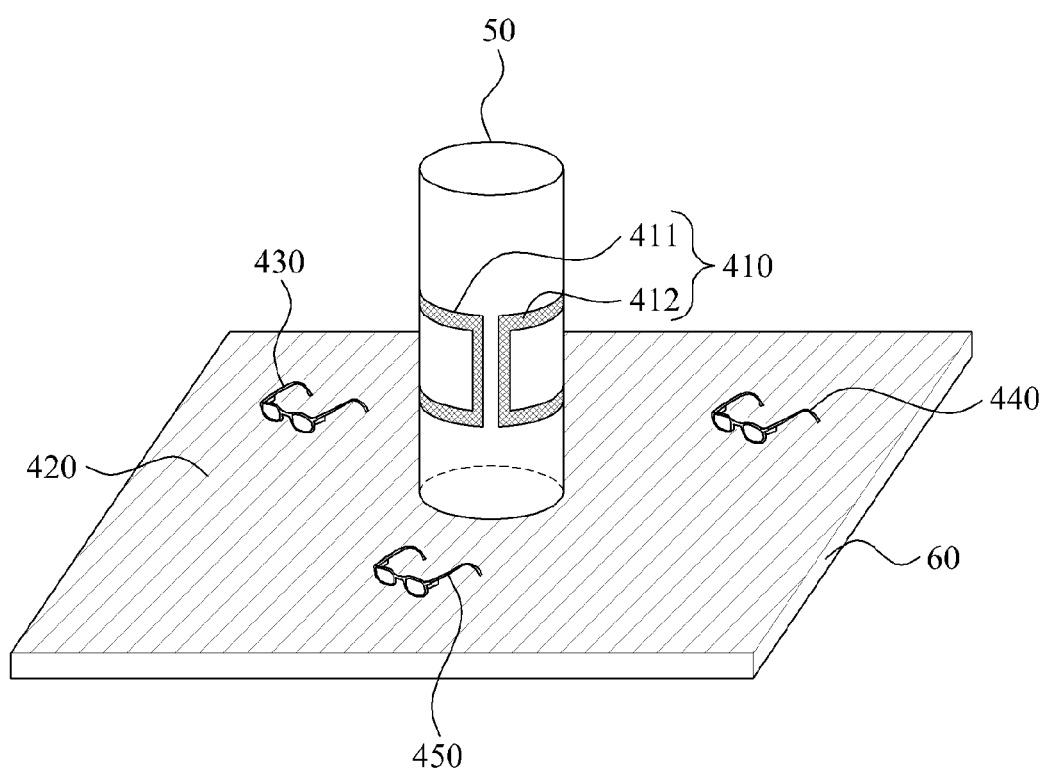
FIG. 4 is a diagram illustrating another example of a wireless charging set.

FIG. 4 illustrates another example of a wireless charging set.

Referring to FIG. 4, the wireless charging set includes a plurality of source units 410 and 420, and a plurality of devices 430 to 450.

The source unit 410 may be disposed on a bar 50 in a pillar shape, and may include a plurality of source resonators 411 and 412. The source unit 410 is the same as a source unit 210 of FIG. 2, and a further description is omitted.

The source unit 420 may be inserted into a charging platform 60 in which a plurality of devices 430 to 450 may be placed near to or on to be charged. The source unit 420 is the same as a source unit 310 of FIG. 3, and a further description is omitted.

The plurality of source resonators 411 and 412 of the source unit 410 disposed on the bar 50 may be perpendicular to a source resonator of the source unit 420 disposed on the charging platform 60. As a result, interference that occurs between the plurality of source resonators may be reduced and minimized. Thus, regardless of a location that the plurality of devices 430 to 450 are placed on the charging platform 60, the wireless power may be more efficiently transmitted and received. In this example, a feeder supplying a power to the source unit 410 and the source unit 420 may be configured as a single entity to supply the power to the source unit 410 and the source unit 420, simultaneously or respectively. The feeder may be configured for each of source units 410 and 420 to supply the power to the each of source units 410 and 420.

Accordingly, when a single target resonator is inserted into the device 430, or two target resonators are inserted into the device 430 such that they are approximately perpendicular to each other, the device 430 may receive the wireless power to be charged.

The feeder may be any type of power supply that my supply power to the source units 410 and 420. For example, the feeder may supply power to the source units 410 and 420 via a wired connection and/or via a wireless connection.

Figure 5:
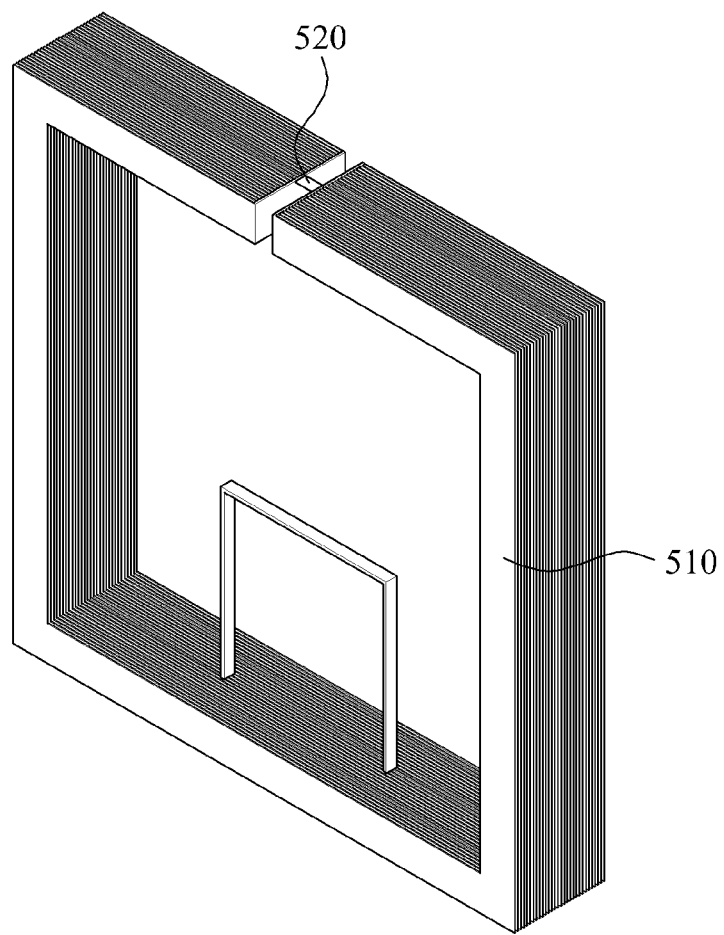
FIG. 5 is a diagram illustrating an example of a source resonator to transmit power wirelessly.

FIG. 5 illustrates an example of a source resonator to transmit power wirelessly.

A source resonator of a source unit 310 illustrated in FIG. 3 may be, for example, a mu negative (MNG) resonator. A source resonator illustrated in FIG. 5 may transmit power wirelessly in all directions, and may include a transmission line unit 510 and a capacitor 520.

The transmission line unit 510 may include a plurality of transmission line sheets that are disposed in parallel. The capacitor 520 may be inserted in a predetermined location of the transmission line unit 510. An electric field generated in the source resonator may be constrained in the capacitor 520.

The capacitor 520 may have various shapes, for example, a shape of a lumped element, a distributed element, and the like. For example, an interdigital capacitor or a gap capacitor interposing a substrate that has a high permittivity in an intermediate, position may be inserted into the capacitor 520. When the capacitor 520 is inserted into the transmission line unit 510, the source resonator may have a property of a metamaterial.

A metamaterial indicates a material that has a predetermined electrical property that is absent in nature, and thus, may have an artificially designed structure. An electromagnetic characteristic of all the materials existing in nature may have a unique magnetic permeability or a unique permittivity. Most materials have a positive magnetic permeability or a positive permittivity. In the case of most materials, a right hand rule may be applied to an electric field, a magnetic field, and a pointing vector, and thus, the corresponding materials may be referred to as right handed materials (RHMs).

However, the metamaterial has a magnetic permeability or a permittivity that is absent in nature, and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor 520 inserted as the lumped element is appropriately determined, the source resonator 500 may have the characteristic of the metamaterial. Because the source resonator 500 may have a negative magnetic permeability by appropriately adjusting the capacitance of the capacitor 520, the source resonator 500 may also be referred to as an MNG resonator 500. A resonance frequency in the MNG resonator 500 may be changed by appropriately designing the capacitor 520, without changing a physical size of the MNG resonator 500. The MNG resonator 500 may have a relatively high Q-factor using the capacitor 520 as the lumped element, and thus, it is possible to enhance an efficiency of wireless power transmission.

Figure 6:
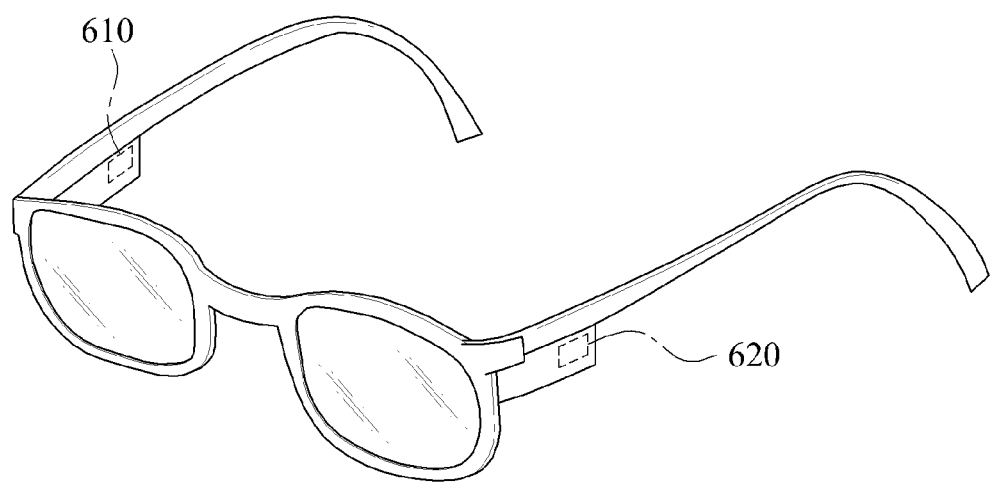
FIG. 6 is a diagram illustrating an example of a target resonator inserted into a device.

FIG. 6 illustrates an example of a target resonator inserted into a device.

The device illustrated in FIG. 6 may correspond to, for example, devices 220 to 240, and 320 to 360 described with reference to FIG. 2 or FIG. 3. A location into which a plurality of target resonators 610 and 620 are inserted is not limited to the example shown in FIG. 6, and it should be appreciated that the target resonators may be inserted wherever desired. For example, when the device is 3D eyewear for viewing an image, the plurality of target resonators 610 and 620 may be inserted into various locations such as a temple of the eyewear, a bridge or a frame of the eyewear, and the like. For example, the 3D eyewear may include a first target resonator disposed in a temple of the eyewear, and a second target resonator disposed in a bridge or a frame of the eyewear. As another example, the plurality of target resonators 610 and 620 may be detachably inserted into the 3D eyewear or a Bluetooth headset.

A size ratio of the plurality of target resonators 610 and 620 illustrated in FIG. 6 to device is not fixed, and may change. The size of the plurality of target resonators 610 and 620 may be smaller or larger than the size of the plurality of target resonators 610 and 620 illustrated in FIG. 6.

For example, when the plurality of target resonators 610 and 620 are disposed in a temple on the right side of the frame, a battery and a charging circuit may be configured to be disposed in the other left frame.

At least one of the plurality of target resonators 610 and 620 may be, for example, a 3D resonator in which a plurality of thin film resonators are disposed in parallel. At least one of the plurality of target resonators 610 and 620 may be in a shape of an MNG resonator described with reference to FIG. 4. When the plurality of target resonators 610 and 620 are disposed such that they are approximately parallel or configured to be in the shape of the MNG resonator, receiving efficiency and a reception length of the wireless power may be enhanced.

For example, the target resonator or the recharging circuit described with reference to FIG. 2 and FIG. 3 may be wrapped with a film for protecting and shielding from an external stimulation or water.

Because the source resonator to transmit the wireless power may have omni-directionality for transmitting the wireless power in all directions, the device may be charged regardless of a direction in which the wireless power is transmitted, a location at which the wireless power is transmitted, and an angle of the target resonator for receiving the wireless power. Accordingly, because the device may be charged regardless of a location where the target resonator is placed, a recharging efficiency may be enhanced.

Because the plurality of devices may be simultaneously charged through a single source resonator, a recharging time during which a user waits may be shortened.

By inserting the plurality of target resonators in a single device, and by recharging the device using the matched target resonators, a recharging rate may be enhanced.

For example, a source resonator and/or a target resonator may be configured as a helix coil structured resonator, a spiral coil structured resonator, a meta-structured resonator, and the like.

All materials may have a unique magnetic permeability (Mμ) and a unique permittivity, epsilon (∈). The magnetic permeability indicates a ratio between a magnetic flux density that occurs with respect to a given magnetic field in a corresponding material and a magnetic flux density that occurs with respect to the given magnetic field in a vacuum state. The magnetic permeability and the permittivity may determine a propagation constant of a corresponding material at a given frequency or at a given wavelength. An electromagnetic characteristic of the corresponding material may be determined based on the magnetic permeability and the permittivity.

For example, a material having a magnetic permeability or a permittivity absent in nature and that is artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 7:
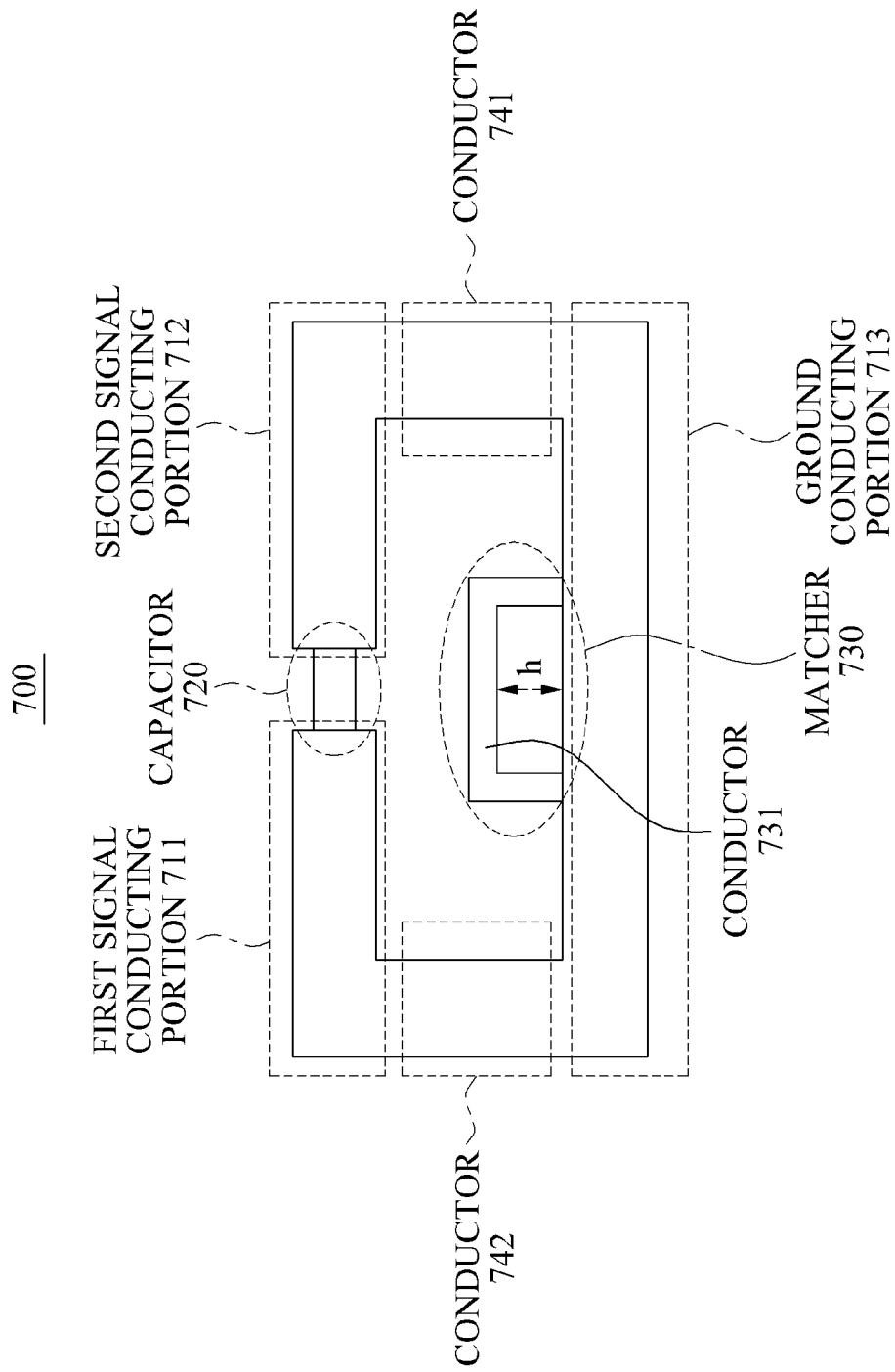
FIG. 7 through FIG. 13 are diagrams illustrating various examples of a resonator structure.

FIG. 7 illustrates a two-dimensional (2D) example of a resonator.

Referring to FIG. 7, resonator 700 includes a transmission line, a capacitor 720, a matcher 730, and conductors 741 and 742. In this example, the transmission line includes a first signal conducting portion 711, a second signal conducting portion 712, and a ground conducting portion 713.

The capacitor 720 may be inserted in series between the first signal conducting portion 711 and the second signal conducting portion 712, and an electric field may be confined within the capacitor 720. For example, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. In this example, a conductor disposed in an upper portion of the transmission line is referred to as the first signal conducting portion 711 and the second signal conducting portion 712. A conductor disposed in the lower portion of the transmission line is referred to as the ground conducting portion 713.

In this example, the transmission line includes the first signal conducting portion 711 and the second signal conducting portion 712 in the upper portion of the transmission line, and includes the ground conducting portion 713 in the lower portion of the transmission line. For example, the first signal conducting portion 711 and the second signal conducting portion 712 may be disposed such that they face the ground conducting portion 713. Current may flow through the first signal conducting portion 711 and the second signal conducting portion 712.

One end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, such that the resonator 700 has an electrically closed-loop structure. The term "loop structure" may include a polygonal structure, for example, a circular structure, a rectangular structure, and the like. The loop structure indicates a circuit that is electrically closed.

The capacitor 720 may be inserted into an intermediate portion of the transmission line. For example, the capacitor 720 may be inserted into a space between the first signal conducting portion 711 and the second signal conducting portion 712. The capacitor 720 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

When the capacitor 720 is inserted into the transmission line, the resonator 700 may have a property of a metamaterial. The metamaterial indicates a material that has a predetermined electrical property that is absent in nature, and thus, may have an artificially designed structure. An electromagnetic characteristic of materials that exist in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs).

However, a metamaterial has a magnetic permeability or a permittivity absent in nature and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is appropriately determined, the resonator 700 may have the characteristic of the metamaterial. Because the resonator 700 may have a negative magnetic permeability by adjusting the capacitance of the capacitor 720, the resonator 700 may also be referred to as an MNG resonator. Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. The capacitance of the capacitor 720 may be determined based on one or more criterion.

The resonator 700, also referred to as the MNG resonator 700, may have a zeroth order resonance characteristic that has, as a resonance frequency, a frequency when a propagation constant is "0". For example, a zeroth order resonance characteristic may be a frequency transmitted through a line or a medium that has a propagation constant of "0." Because the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. The MNG resonator 700 may have a relatively high Q-factor using the capacitor 720 of the lumped element and thus, it is possible to enhance an efficiency of power transmission. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 700 may include the matcher 730 for impedance matching. The matcher 730 may adjust the strength of a magnetic field of the MNG resonator 700. An impedance of the MNG resonator 700 may be determined by the matcher 730. For example, current may flow into and/or out of the MNG resonator 700 via a connector. The connector may be connected to the ground conducting portion 713 or the matcher 730. Power may be transferred through coupling without using a physical connection between the connector and the ground conducting portion 713 or the matcher 730.

For example, as shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 for the impedance matching in a location that is separated from the ground conducting portion 713 by a distance h. Accordingly, the impedance of the resonator 700 may be changed by adjusting the distance h.

Although not illustrated in FIG. 7, a controller may be provided to control the matcher 730. In this example, the matcher 730 may change the physical shape of the matcher 730 based on a control signal generated by the controller. For example, the distance h between the conductor 731 of the matcher 730 and the ground conducting portion 713 may increase or decrease based on the control signal. Accordingly, the physical shape of the matcher 730 may be changed and the impedance of the resonator 700 may be adjusted. The controller may generate the control signal based on various factors, which is further described later.

As shown in FIG. 7, the matcher 730 may be configured as a passive element such as the conductor 731. As another example, the matcher 730 may be configured as an active element such as a diode, a transistor, and the like. When the active element is included in the matcher 730, the active element may be driven based on the control signal generated by the controller, and the impedance of the resonator 700 may be adjusted based on the control signal. For example, a diode that is a type of active element may be included in the matcher 730. The impedance of the resonator 700 may be adjusted depending on whether the diode is in an ON state or in an OFF state.

Although not illustrated in FIG. 7, a magnetic core may pass through the MNG resonator 700. The magnetic core may increase a power transmission distance.

Figure 8:
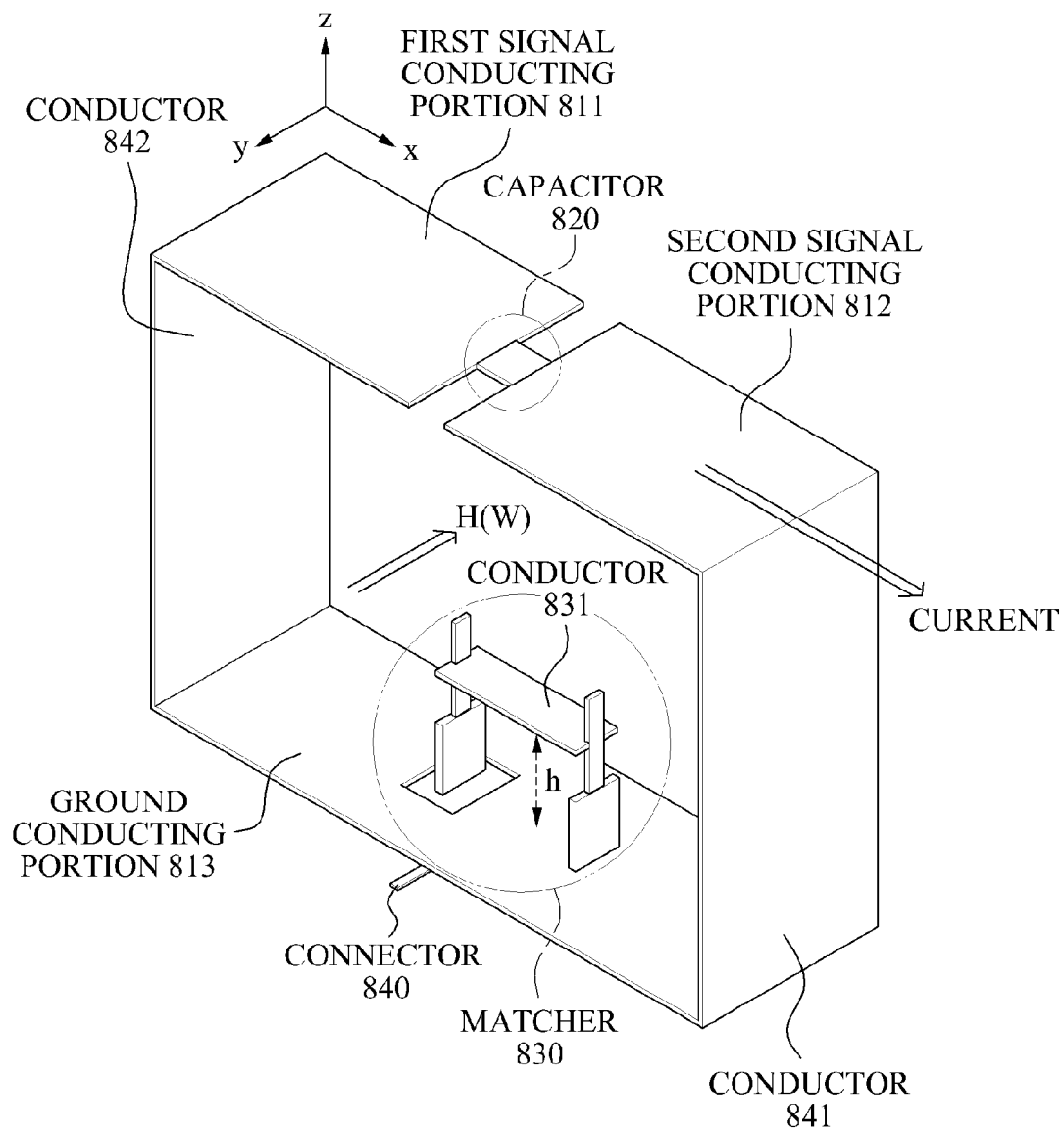

FIG. 8 illustrates a three-dimensional (3D) example of a resonator.

Referring to FIG. 8, the resonator 800 includes a transmission line and a capacitor 820. In this example, the transmission line includes a first signal conducting portion 811, a second signal conducting portion 812, and a ground conducting portion 813. The capacitor 820 may be inserted in series between the first signal conducting portion 811 and the second signal conducting portion 812 of the transmission line, and an electric field may be confined within the capacitor 820.

In this example, the transmission line includes the first signal conducting portion 811 and the second signal conducting portion 812 in an upper portion of the resonator 800, and includes the ground conducting portion 813 in a lower portion of the resonator 800. For example, the first signal conducting portion 811 and the second signal conducting portion 812 may be disposed to face the ground conducting portion 813. Current may flow in an x direction through the first signal conducting portion 811 and the second signal conducting portion 812. As a result of the current, a magnetic field H(W) may be formed in a −y direction. Alternatively, unlike the diagram of FIG. 8, the magnetic field H(W) may be formed in a +y direction.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, such that the resonator 800 has an electrically closed-loop structure, as described with reference to FIG. 7.

As shown in FIG. 8, the capacitor 820 may be inserted between the first signal conducting portion 811 and the second signal conducting portion 812. For example, the capacitor 820 may be inserted into a space between the first signal conducting portion 811 and the second signal conducting portion 812. The capacitor 820 may have various shapes and sizes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 820 is inserted into the transmission line, the resonator 800 may have a property of a metamaterial.

When a capacitance of the capacitor inserted as the lumped element is appropriately determined, the resonator 800 may have the characteristic of the metamaterial. Because the resonator 800 may have a negative magnetic permeability by adjusting the capacitance of the capacitor 820, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. The capacitance of the capacitor 820 may be determined based on one or more criterion.

The resonator 800, also referred to as the MNG resonator 800, may have a zeroth order resonance characteristic that has, as a resonance frequency, a frequency when a propagation constant is "0". Because the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. For example, because the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820 and thus, the magnetic field may become further dominant.

Also, the MNG resonator 800 may include the matcher 830 for impedance matching. The matcher 830 may adjust the strength of magnetic field of the MNG resonator 800. An impedance of the MNG resonator 800 may be determined by the matcher 830. For example, current may flow into and/or out of the MNG resonator 800 via a connector 840. The connector 840 may be connected to the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance matching in a location separate from the ground conducting portion 813 by a distance h. Accordingly, the impedance of the resonator 800 may be changed by adjusting the distance h.

Although not illustrated in FIG. 8, a controller may be provided to control the matcher 830. In this example, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed and the impedance of the resonator 800 may be adjusted.

The distance h between the conductor 831 of the matcher 830 and the ground conducting portion 831 may be adjusted using a variety of schemes. For example, a plurality of conductors may be included in the matcher 830 and the distance h may be adjusted by adaptively activating one of the conductors. As another example, the distance h may be adjusted by adjusting the physical location of the conductor 831 up and down. The distance h may be controlled based on the control signal of the controller. For example, the controller may generate the control signal using various factors. An example of the controller generating the control signal is further described later.

As shown in FIG. 8, the matcher 830 may be configured as a passive element such as the conductor 831. As another example, the matcher 830 may be configured as an active element such as a diode, a transistor, and the like. When the active element is included in the matcher 830, the active element may be driven based on the control signal generated by the controller, and the impedance of the resonator 800 may be adjusted based on the control signal. For example, a diode that is an active element may be included in the matcher 830. The impedance of the resonator 800 may be adjusted depending on whether the diode is in an ON state or in an OFF state.

Although not illustrated in FIG. 8, a magnetic core may pass through the resonator 800 configured as the MNG resonator. The magnetic core may increase a power transmission distance.

Figure 9:
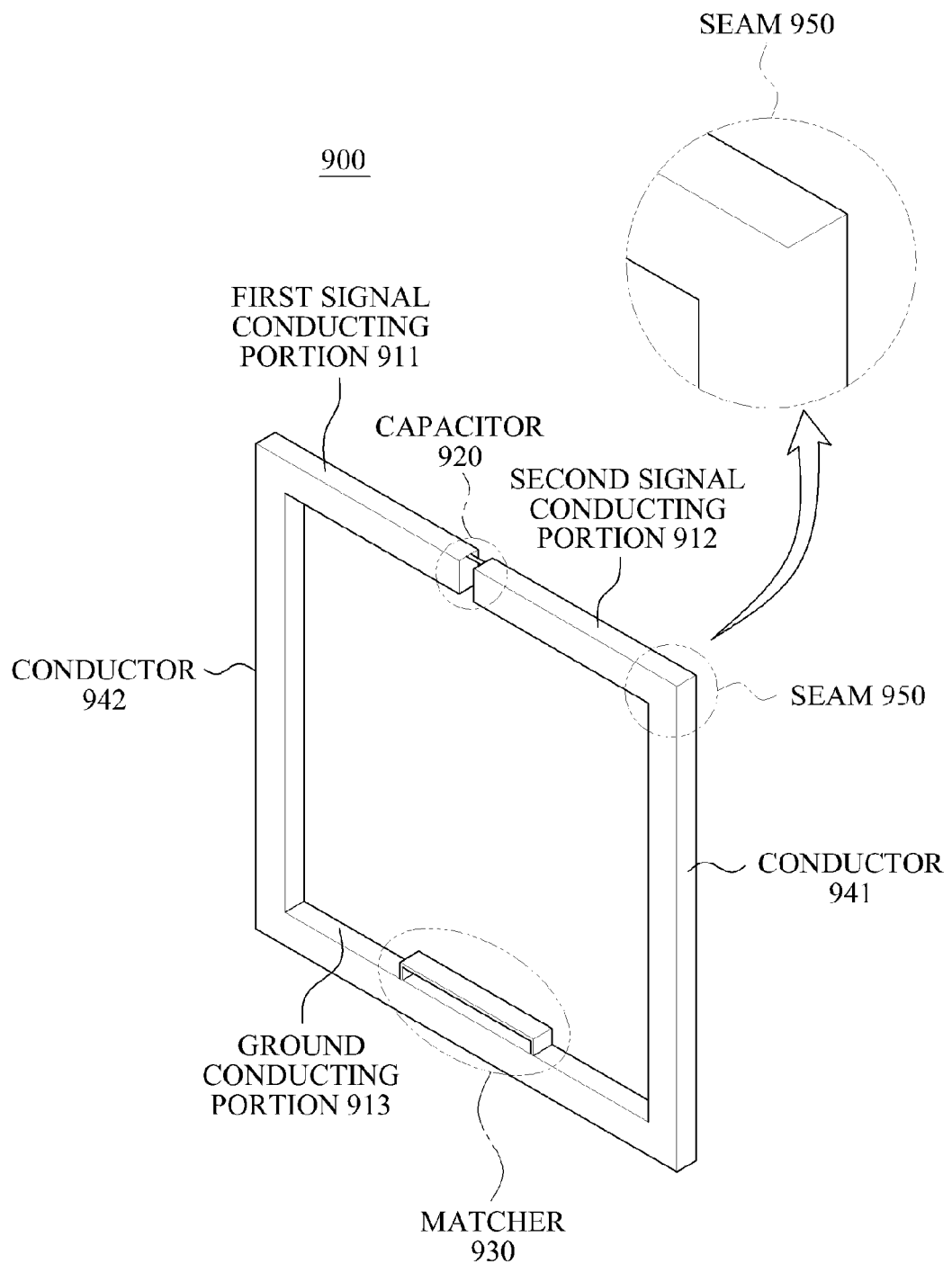

FIG. 9 illustrates an example of a bulky-type resonator for wireless power transmission.

Referring to FIG. 9, a first signal conducting portion 911 and a second signal conducting portion 912 may be integrally formed instead of being separately manufactured and later connected to each other. Similarly, the second signal conducting portion 912 and the conductor 941 may also be integrally manufactured.

When the second signal conducting portion 912 and the conductor 941 are separately manufactured and connected to each other, a loss of conduction may occur due to a seam 950. The second signal conducting portion 912 and the conductor 941 may be connected to each other without using a separate seam such that they are seamlessly connected to each other. Accordingly, it is possible to decrease a conductor loss caused by the seam 950. Accordingly, the second signal conducting portion 912 and the ground conducting portion 931 may be seamlessly and integrally manufactured. Similarly, the first signal conducting portion 911 and the ground conducting portion 931 may be seamlessly and integrally manufactured.

Referring to FIG. 9, a type of a seamless connection connecting at least two partitions into an integrated form is referred to as a bulky-type.

Figure 10:
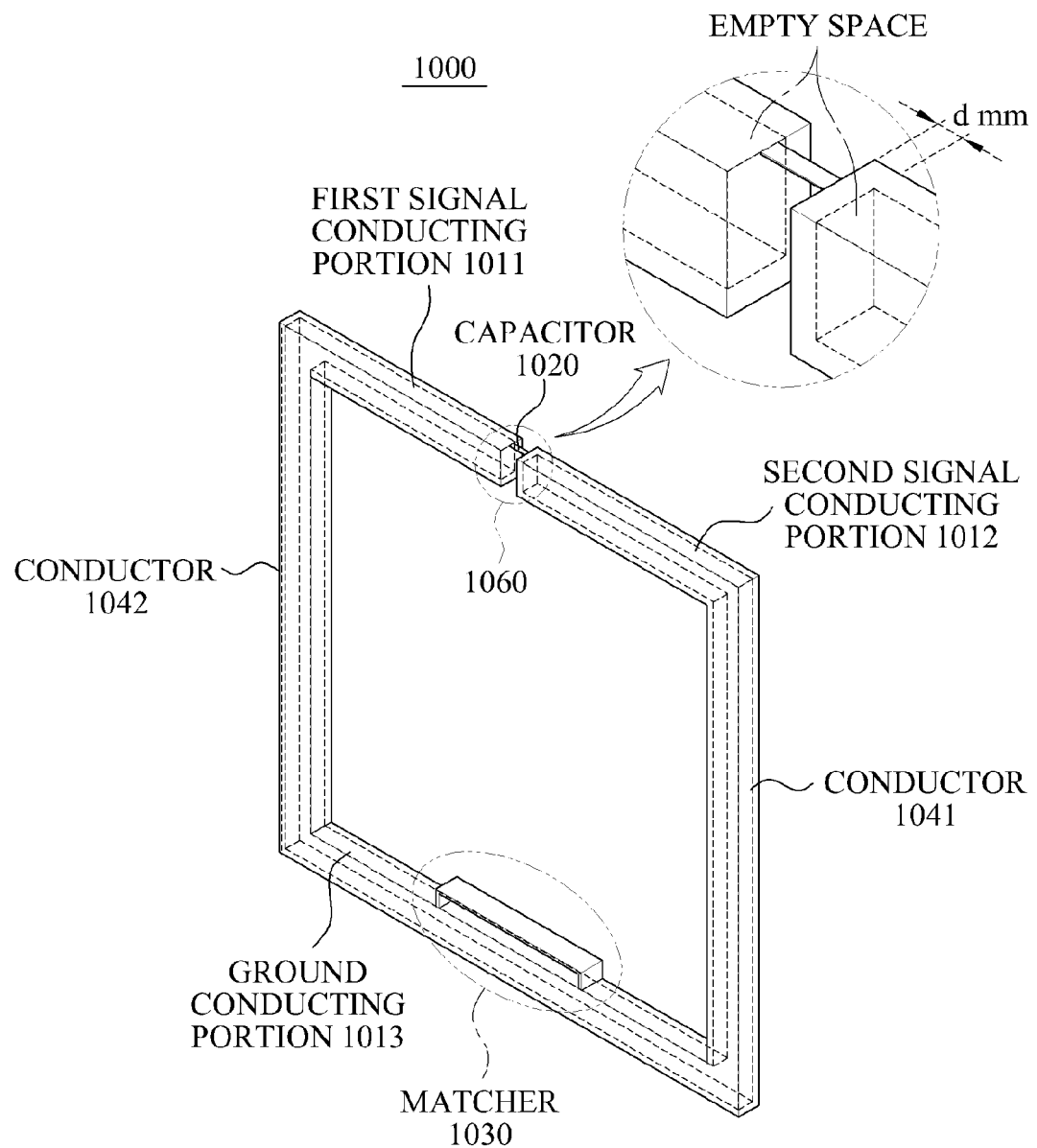

FIG. 10 illustrates an example of a hollow-type resonator for wireless power transmission.

Referring to FIG. 10, each of a first signal conducting portion 1011, a second signal conducting portion 1012, a ground conducting portion 1013, and conductors 1041 and 1042 of the resonator 1000 configured as the hollow-type may include an empty space inside.

In a given resonance frequency, an active current may be modeled to flow in only a portion of the first signal conducting portion 1011 instead of the entire first signal conducting portion 1011, only a portion of the second signal conducting portion 1012 instead of the entire second signal conducting portion 1012, only a portion of the ground conducting portion 1013 instead of the entire ground conducting portion 1013, and only a portion of the conductors 1041 and 1042 instead of the entire conductors 1041 and 1042. For example, when a depth of each of the first signal conducting portion 1011, the second signal conducting portion 1012, the ground conducting portion 1013, and the conductors 1041 and 1042 is significantly deeper than a corresponding skin depth in the given resonance frequency, it may be ineffective. The significantly deeper depth may increase a weight or manufacturing costs of the resonator 1000.

Accordingly, in the given resonance frequency, the depth of each of the first signal conducting portion 1011, the second signal conducting portion 1012, the ground conducting portion 1013, and the conductors 1041 and 1042 may be appropriately determined based on the corresponding skin depth of each of the first signal conducting portion 1011, the second signal conducting portion 1012, the ground conducting portion 1013, and the conductors 1041 and 1042. When the first signal conducting portion 1011, the second signal conducting portion 1012, the ground conducting portion 1013, and the conductors 1041 and 1042 have an appropriate depth that is deeper than a corresponding skin depth, the resonator 1000 may become light, and manufacturing costs of the resonator 1000 may also decrease.

For example, as shown in FIG. 10, the depth of the second signal conducting portion 1012 may be determined as "d" millimeters and d may be determined according to $$d = \frac{1}{\sqrt{\pi f \mu \sigma}}.$$

In this example, f corresponds to a frequency, μ corresponds to a magnetic permeability, and σ corresponds to a conductor constant.

For example, when the first signal conducting portion 1011, the second signal conducting portion 1012, the ground conducting portion 1013, and the conductors 1041 and 1042 are made of a copper and have a conductivity of 5.8×107 siemens per meter (S·m−1), the skin depth may be about 0.6 mm with respect to 10 kHz of the resonance frequency and the skin depth may be about 0.006 mm with respect to 100 MHz of the resonance frequency.

Figure 11:
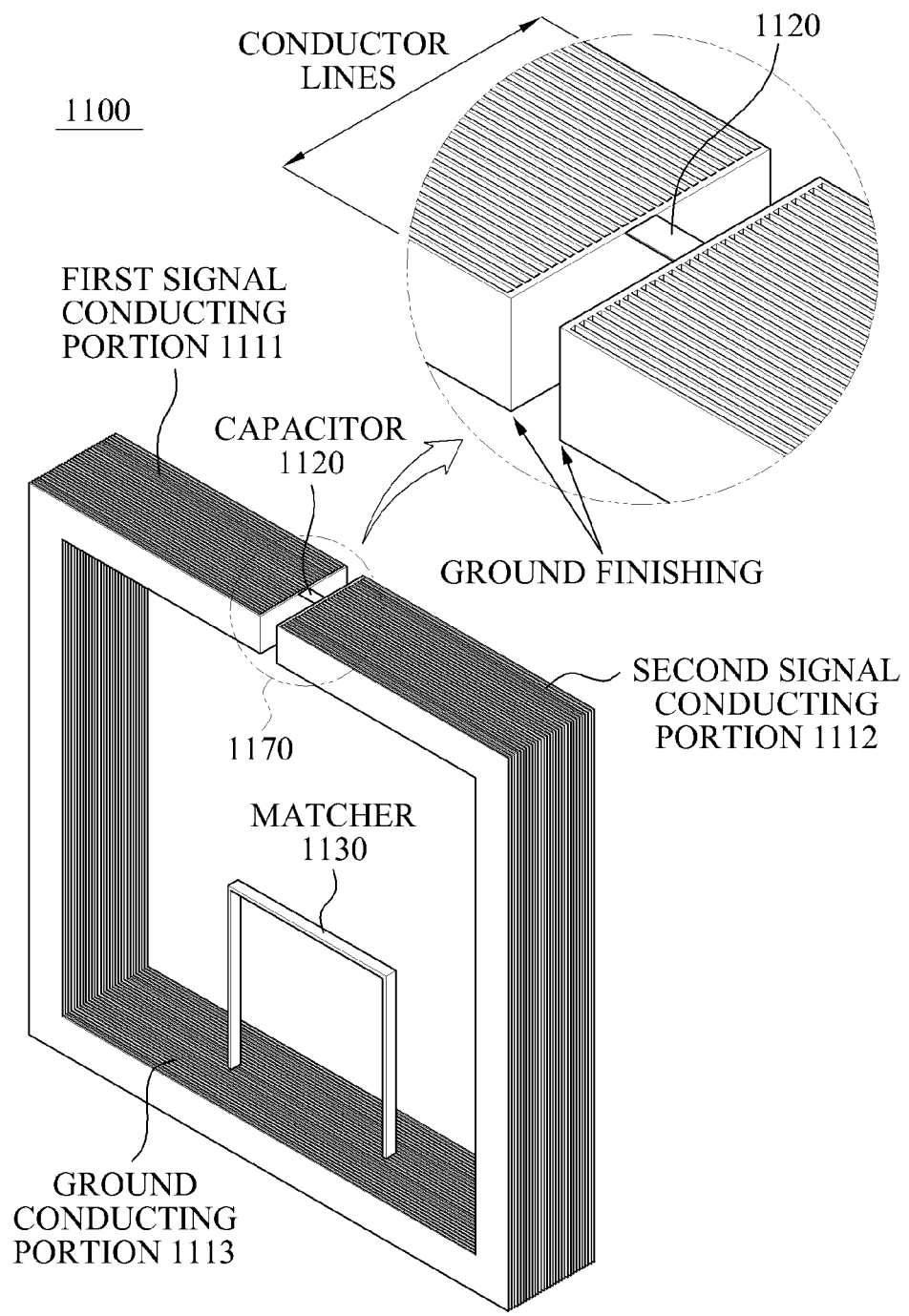

FIG. 11 illustrates an example of a resonator for wireless power transmission using a parallel-sheet.

Referring to FIG. 11, the parallel-sheet may be applicable to each of a first signal conducting portion 1111 and a second signal conducting portion 1112 included in the resonator 1100.

For example, the first signal conducting portion 1111 and the second signal conducting portion 1112 may not be a perfect conductor and thus, may have a resistance. Due to the resistance, an ohmic loss may occur. The ohmic loss may decrease a Q-factor and may also decrease a coupling effect.

By applying the parallel-sheet to each of the first signal conducting portion 1111 and the second signal conducting portion 1112, it is possible to decrease the ohmic loss, and to increase the Q-factor and the coupling effect. For example, referring to a portion 1170 indicated by a circle, when the parallel-sheet is applied, each of the first signal conducting portion 1111 and the second signal conducting portion 1112 may include a plurality of conductor lines. For example, the plurality of conductor lines may be disposed in parallel, and may be shorted at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. As a result, the resistance loss may decrease, and the Q-factor and the coupling effect may increase.

Figure 12:
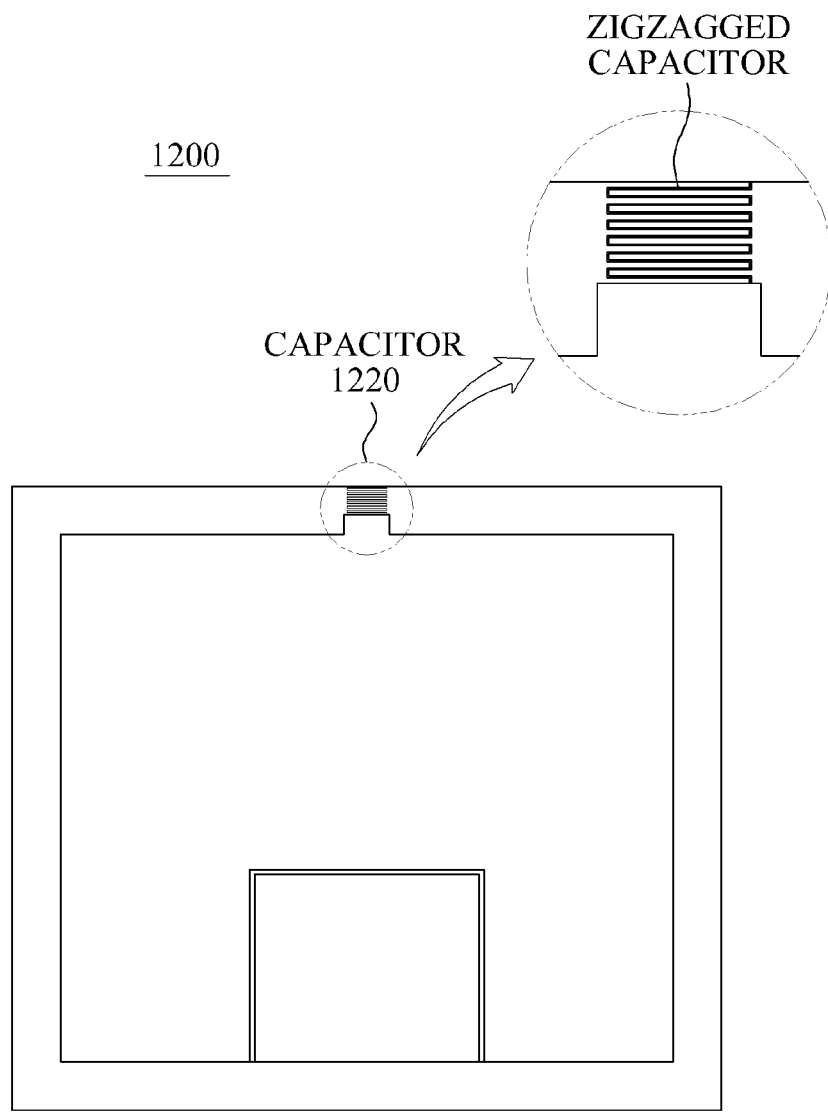

FIG. 12 illustrates an example of a resonator for wireless power transmission that includes a distributed capacitor.

Referring to FIG. 12, a capacitor 1220 included in the resonator 1200 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1220 as a distributed element, it is possible to decrease the ESR. A loss caused by the ESR may decrease a Q-factor and a coupling effect.

As shown in FIG. 12, the capacitor 1220 as the distributed element may have a zigzagged structure. For example, the capacitor 1220 as the distributed element may be configured as a conductive line and a conductor having the zigzagged structure.

As shown in FIG. 12, by employing the capacitor 1220 as the distributed element, it is possible to decrease the loss that occurs due to the ESR. In addition, by disposing a plurality of capacitors as lumped elements, it is possible to decrease the loss that occurs due to the ESR. Because a resistance of each of the capacitors as the lumped elements decreases through a parallel connection, active resistances of parallel-connected capacitors as the lumped elements may also decrease and the loss that occurs due to the ESR may decrease. For example, by employing ten capacitors of 1 pF instead of using a single capacitor of 10 pF, it is possible to decrease the loss occurring due to the ESR.

Figure 13A:
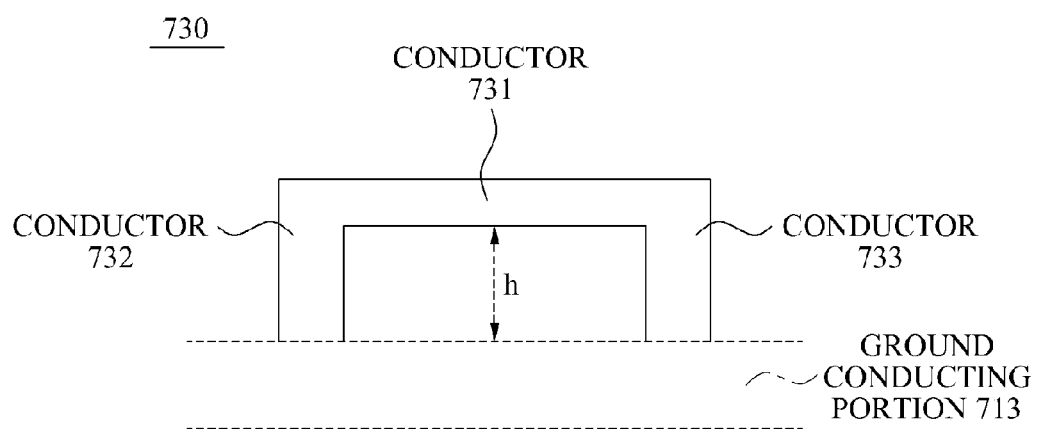
Figure 13B:
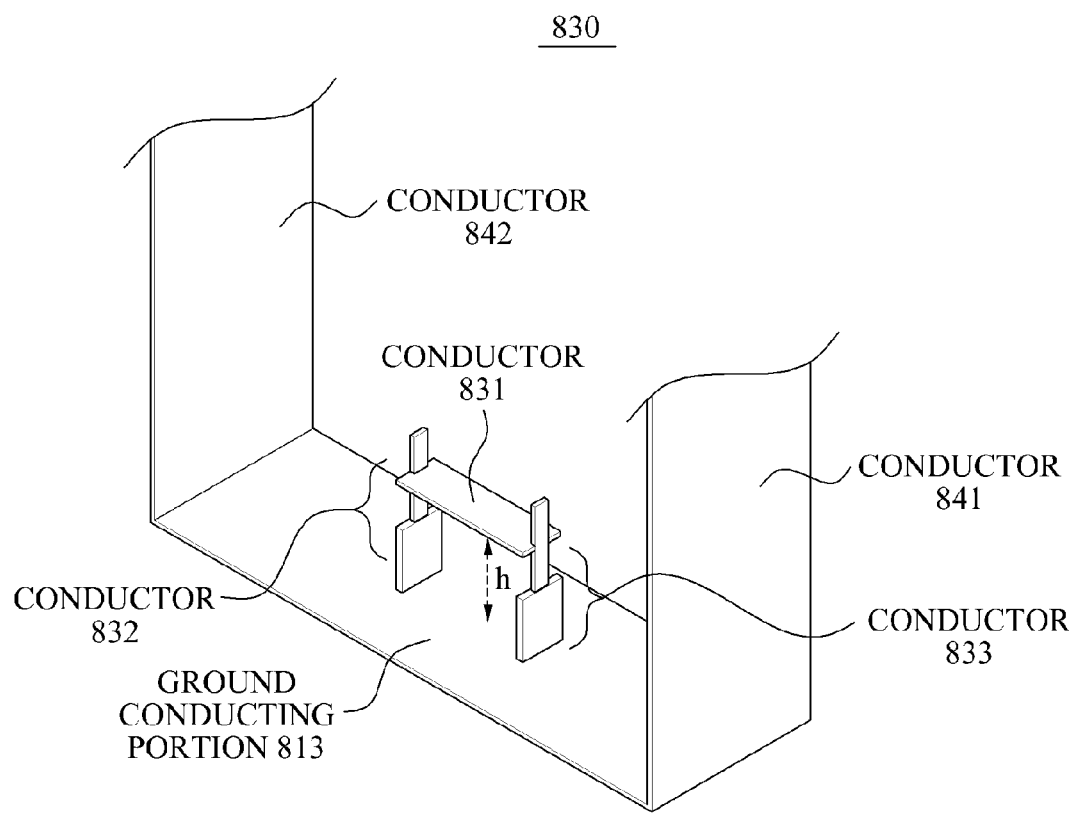

FIG. 13A includes an example of the matcher 730 used in the resonator 700 of FIG. 7, and FIG. 13B includes an example of the matcher 830 used in the resonator 800 of FIG. 8.

FIG. 13A illustrates a portion of the 2D resonator example including the matcher 730, and FIG. 13B illustrates a portion of the 3D resonator example including the matcher 830.

Referring to FIG. 13A, the matcher 730 includes a conductor 731, a conductor 732, and a conductor 733. The conductors 732 and 733 may be connected to the ground conducting portion 713 and the conductor 731. The impedance of the resonator may be determined based on a distance h between the conductor 731 and the ground conducting portion 713. For example, the distance h between the conductor 731 and the ground conducting portion 713 may be controlled by the controller. The distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Referring to FIG. 13B, the matcher 830 includes a conductor 831, a conductor 832, and a conductor 833. The conductors 832 and 833 may be connected to the ground conducting portion 813 and the conductor 831. The conductors 832 and 833 may be connected to the ground conducting portion 813 and the conductor 831. The impedance of the 3D resonator may be determined based on a distance h between the conductor 831 and the ground conducting portion 813. For example, the distance h between the conductor 831 and the ground conducting portion 813 may be controlled by the controller. Similar to the matcher 730 included in the 2D resonator example, in the matcher 830 included in the 3D resonator example, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element may be similar as described above. For example, the impedance of the resonator may be adjusted by changing a path of current flowing through the matcher using the active element.

Figure 14:
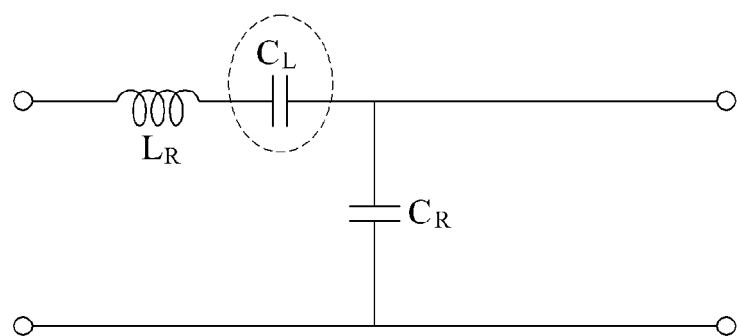
FIG. 14 is a diagram illustrating an example of an equivalent circuit of the resonator for wireless power transmission of FIG. 7.

FIG. 14 illustrates an example of an equivalent circuit of the resonator 700 for the wireless power transmission of FIG. 7.

The resonator 700 for the wireless power transmission may be modeled to the equivalent circuit of FIG. 14. In the equivalent circuit of FIG. 14, CL corresponds to a capacitor that is inserted in a form of a lumped element in the middle of the transmission line of FIG. 7.

In this example, the resonator 700 may have a zeroth resonance characteristic. For example, when a propagation constant is "0", the resonator 700 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \qquad \text{[Equation 2]}$$

In Equation 2, MZR corresponds to a Mu zero resonator.

Referring to Equation 2, the resonance frequency $\omega_{MZR}$ of the resonator 700 may be determined by $L_R/C_L$. A physical size of the resonator 700 and the resonance frequency $\omega_{MZR}$ may be independent with respect to each other. Accordingly, because the physical sizes are independent with respect to each other, the physical size of the resonator 700 may be sufficiently reduced.

Described herein is a wireless charging set that includes a source unit that supplies power wirelessly to one or more devices. The source unit includes an exterior surface, and one or more source resonators may be flexible disposed on the exterior surface. The one or more resonators are configured to transmit power wirelessly to at least one device.

For example, the source unit may include a cylindrical shape, and the one or more source resonators may be flexibly wrapped around the cylindrical shaped exterior surface. As another example, the source unit may include a platform and a cylindrical shaped bar may protrude from the platform, and each of the platform and the cylindrically shaped bar may include one or more source resonators for wirelessly transmitting power to the at least one device.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless charging set comprising:
   a source unit configured to be flexible and comprising a source resonator configured to transmit power wirelessly; and
   a device comprising a target resonator matched with the transmitted wireless power, wherein the target resonator is configured to receive the wireless power from the source unit and to charge a power load using the received wireless power,
   wherein the source unit is flexibly wrapped around a bar, and
   wherein the source unit is configured to transmit power wirelessly in an omni-directional fashion.

2. The wireless charging set of claim 1, wherein the bar has a pillar shape, and the source unit is disposed around the bar, and the device is located around the bar.

3. The wireless charging set of claim 1, wherein the source unit is disposed in a charging platform of the device.

4. The wireless charging set of claim 1, wherein the source unit is disposed in a bar in a pillar shape and a charging platform of the device.

5. The wireless charging set of claim 1, wherein, when a plurality of devices are to be charged, the plurality of devices are simultaneously charged by the source unit.

6. The wireless charging set of claim 1, wherein the device comprises target resonators, and the target resonators are disposed perpendicular to each other.

7. The wireless charging set of claim 1, the device comprises target resonators, and the target resonators simultaneously receive the wireless power.

8. The wireless charging set of claim 1, wherein the source resonator is a thin film resonator.

9. The wireless charging set of claim 1, wherein the target resonator is wrapped with a film for waterproofing and shielding.

10. The wireless charging set of claim 1, wherein:
    the device is three dimensional (3D) eyewear; and
    the 3D eyewear includes a first target resonator disposed in a temple of the eyewear, and a second target resonator disposed in a bridge or a frame of the eyewear.

11. A flexible source unit for wirelessly transmitting power to a device, the source unit comprising:
    a bar including an exterior surface; and
    a source resonator configured to be flexible that is disposed on the exterior surface and to transmit power wirelessly to the device,
    wherein the source unit is flexibly wrapped around the bar, and
    wherein the source unit is configured to transmit power wirelessly in an omni-directional fashion.

12. The flexible source unit of claim 11, wherein the exterior surface of the bar comprises a cylindrical shape, and the source resonator is flexibly wrapped around the cylindrical shaped exterior surface.

13. The flexible source unit of claim 11, further comprising:
    a platform from which the bar protrudes; and
    at least another source resonator disposed on an exterior surface of the platform.

14. The flexible source unit of claim 11, further comprising a plurality of source resonators that are disposed in parallel to each other on the exterior surface.

15. The flexible source unit of claim 11, wherein the source resonator is configured to simultaneously transmit power wirelessly to a plurality of devices.

16. A device for receiving power wirelessly from a flexible source unit that comprises one or more source resonators attached to an exterior surface of the source unit, the device comprising:
   a target resonator configured to receive power wirelessly from the one or more flexible source resonators of the source unit; and
   a target unit configured to transfer the received power to drive the operation of the device,
   wherein at least one of the source resonators is flexibly wrapped around a bar, and
   wherein the source unit is configured to transmit power wirelessly in an omni-directional fashion.

17. The device of claim 16, further comprising a matching control configured to set an impedance matching frequency of the target resonator to perform impedance matching with the one or more flexible source resonators and the target resonator.

18. The wireless charging set of claim 1, wherein the source resonator is a MNG (mu negative) resonator, and wherein the MNG resonator comprises:
   a capacitor; and
   a matcher configured to adjust a magnetic field of the MNG resonator.

19. The wireless charging set of claim 18, wherein the matcher is configured to change, based upon a control signal generated by a controller, a distance between a conductor of the matcher and a ground conducting portion of the MNG resonator.

* * * * *